(12) United States Patent
Hei et al.

(10) Patent No.: US 6,277,344 B1
(45) Date of Patent: *Aug. 21, 2001

(54) SIMULTANEOUS USE OF PEROXYGEN AND OLEFIN COMPOUND IN ODOR REDUCTION

(75) Inventors: Robert D. P. Hei, Oakdale; Keith D. Lokkesmoe, Savage; Louis M. Holzman, St. Paul, all of MN (US)

(73) Assignee: Ecolab Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/435,932

(22) Filed: Nov. 9, 1999

Related U.S. Application Data

(63) Continuation-in-part of application No. 09/114,017, filed on Jul. 10, 1998, now abandoned, which is a continuation-in-part of application No. 09/007,225, filed on Jan. 14, 1998, now Pat. No. 6,015,536.

(51) Int. Cl.$^7$ .......................................... B01J 8/00

(52) U.S. Cl. ................. 423/210; 423/220; 423/226; 423/236; 423/238; 423/242.1; 423/242.2; 423/242.3; 423/243.01; 423/245.2

(58) Field of Search ................... 252/186.29; 423/242.3, 423/245.2, 238, 242.1, 242.2, 236, 243.01, 210, 220

(56) References Cited

U.S. PATENT DOCUMENTS

| | | | |
|---|---|---|---|
| 4,421,664 | 12/1983 | Anderson et al. | 510/374 |
| 4,443,342 | 4/1984 | Stas et al. | 210/759 |
| 4,595,577 | 6/1986 | Stas et al. | 423/245.2 |

(List continued on next page.)

FOREIGN PATENT DOCUMENTS

| | | |
|---|---|---|
| 0 596 493 A1 | 5/1994 | (EP) . |
| 930 584 | 7/1963 | (GB) . |
| 1 370 678 | 10/1974 | (GB) . |
| 2132630 | 7/1984 | (GB) . |
| 52 127487 | 10/1977 | (JP) . |
| 03 190995 | 8/1991 | (JP) . |
| 404108513 | 4/1992 | (JP) . |

OTHER PUBLICATIONS

Aquatoc®/Auinoc® product literature.
Diversey's ODORtech™ System technical literature.
"Equipment For Gas–Liquid Operations", Chapter 6, Mass–Transfer Operations, pp. 139–195.
"Develop a Nose for Odor Control", Chemical Engineering, Oct. 1993, pp. 20–23, 27.
"Peroxygens in environmental protection", Fraser, Effluent and Water Treatment Journal, Jun. 1986, pp. 186–199.

(List continued on next page.)

Primary Examiner—Steven P. Griffin
Assistant Examiner—Maribel Medina
(74) Attorney, Agent, or Firm—Merchant & Gould P.C.

(57) ABSTRACT

Disclosed is a process for the treatment of a plant fluid effluent containing odor compounds including an alkyl mercaptan or an alkyl thiol, an amine compound, ammonia, hydrogen sulfide and mixtures thereof by contacting the plant effluent in either a counterflow or cocurrent flow process. In the process, the effluent is contacted with an aqueous solution comprising a peroxyacid compound and one or more essential oils. When contacted with the peroxyacid, odor compounds in the effluent are oxidized and converted from the gaseous phase into a chemically modified highly aqueous soluble phase in the aqueous treatment. In this way, odor removal from the gas is preferred and odor compounds are efficiently transferred into the aqueous treatment solution. The use of such a process produces a significant improvement in odor quality index as measured by a conventional process using an expert panel when compared to conventional treatment methods.

39 Claims, 3 Drawing Sheets

U.S. PATENT DOCUMENTS

| | | | |
|---|---|---|---|
| 4,874,540 | 10/1989 | Greenwald et al. | 510/476 |
| 4,997,450 | 3/1991 | Olson et al. | 8/109 |
| 5,122,538 | 6/1992 | Lokkesmoe et al. | 514/557 |
| 5,139,788 | 8/1992 | Schmidt | 424/616 |
| 5,200,189 | 4/1993 | Oakes et al. | 424/405 |
| 5,234,719 | 8/1993 | Richter et al. | 427/384 |
| 5,268,002 | 12/1993 | Olson et al. | 8/107 |
| 5,314,687 | 5/1994 | Oakes et al. | 424/405 |
| 5,336,500 | 8/1994 | Richter et al. | 424/405 |
| 5,370,708 | 12/1994 | Olson et al. | 8/108.1 |
| 5,409,713 | 4/1995 | Lokkesmoe et al. | 424/616 |
| 5,419,908 | 5/1995 | Richter et al. | 424/405 |
| 5,436,008 | 7/1995 | Richter et al. | 424/405 |
| 5,437,868 | 8/1995 | Oakes et al. | 424/405 |
| 5,484,549 | 1/1996 | Hei et al. | 424/405 |
| 5,489,434 | 2/1996 | Oakes et al. | 424/405 |
| 5,505,915 | 4/1996 | Copeland et al. | 422/264 |
| 5,567,444 | 10/1996 | Hei et al. | 424/616 |
| 5,578,134 | 11/1996 | Lentsch et al. | 734/3 |
| 5,674,538 | 10/1997 | Lokkesmoe et al. | 424/616 |
| 5,733,474 | 3/1998 | Kagermeier et al. | 252/186.25 |
| 6,015,536 * | 1/2000 | Lokkesmo | 423/20 |

OTHER PUBLICATIONS

"Removal of Nox and SO2 from Flue Gas by Peracid Solutions", Littlejohn et al., Ind. Eng. Chem. Res., 1990, 29, pp. 1420–1424.

"New Treatment Schemes Control Odors", McIlvaine, WATER/Engineering & Management, Jan. 1990, pp. 28–31.

"ODORS: The Other Effluent", Pope et al., CIVIL ENGINEERING, Aug. 1989, pp. 42–44.

* cited by examiner

US 6,277,344 B1

SIMULTANEOUS USE OF PEROXYGEN AND OLEFIN COMPOUND IN ODOR REDUCTION

RELATED APPLICATIONS

This is a continuation-in-part of Lokkesmoe et al., U.S. Ser. No. 09/114,017, filed Jul. 10, 1998, abandoned which is a continuation-in-part of Lokkesmoe et al., U.S. Ser. No. 09/007,225, filed Jan. 14, 1998, now U.S. Pat. No. 6,015,536, issued Jan. 18, 2000, which applications are expressly incorporated by reference herein.

FIELD OF THE INVENTION

The invention relates to the use of peroxygen or peroxyacid compounds in odor reduction. The invention relates to removing odor compounds from an atmospheric effluent or from volumes of gas arising from the processing of organic materials. The processing can occur in large processing plants or in small loci such as kitchens or doctors offices. More specifically, the invention relates to an odor reduction process using liquid/atmospheric or liquid/liquid processing to treat atmospheric or other similar effluent containing odor compounds. The odor can comprise organic and inorganic compounds including organic sulfur compounds, organic nitrogen compounds, organic oxo-compounds, ammonia, hydrogen sulfide, etc. and mixtures thereof. Odor is reduced by means of reacting the effluent containing the odor compounds with an aqueous odor reduction compound. The odor compounds and resulting oxidized materials are then solubilized in and removed by the solvent nature of the aqueous phase. Surprisingly, there is a synergistic effect resulting from the combination of a peroxyacid and one or more olefinic compounds in odor reduction. The success of peroxyacid in odor reduction is surprisingly not excessively affected by the presence of the olefin. The aqueous phase and the solubilized materials can then be discarded into conventional municipal sewage treatment plants.

BACKGROUND OF THE INVENTION

Industrial plants, agricultural installations, hospitals, kitchens, etc. that handle large quantities of organic material such as hog farms, dairy farms, chicken farms, meat packing plants, animal rendering plants, composting plants, paper mills, sewage treatment plants and other similar installations can generate large quantities of odors that typically exit the facility in an odor contaminated atmospheric effluent (flume) or other effluents. Such an effluent can contain a large variety of odoriferous or odor causing inorganic and organic chemicals or molecules including organic sulfides or organic thiols (mercaptans), monoamines, diamines, triamines, ammonia, alcohols, formaldehyde, acetaldehyde, carboxylic acids, skatole, carbon disulfide and hydrogen sulfide and other odor forming oxidizable compounds. An atmospheric effluent having one or more of such compounds can have a strong odor and can be highly objectionable within the plant to plant personnel and outside the plant to plant neighbors.

An odor is a gas phase emission that produces an olfactory stimulus. The odor thresholds of many chemicals that act as odor compositions common throughout the chemical process industries include, for example, ethyl sulfide having an odor threshold in the atmosphere of 0.25 parts per billion (ppb), hydrogen sulfide with an odor threshold of 0.4 ppb, dimethyl sulfide with an odor threshold of 1.0 ppb, ethyl mercaptan with an odor threshold of 1.0 ppb, methyl mercaptan with an odor threshold of 1.1 ppb. With a low threshold a small amount of these and similar odors common in plant effluent are serious olfactory problems. Such odors result from processing large quantities of organic materials and are generated by the action of micro-organisms in any biologically active system on a source of organic material producing the odors. There are many other odor producing chemicals possible, however, as shown in this representative, non-inclusive Tables 1 to 3:

TABLE 1

| Sulfur compounds | |
| --- | --- |
| Hydrogen Sulfide | Thiophene |
| Carbonyl Sulfide | Isobutyl Mercaptan |
| Methyl Mercaptan | Diethyl Sulfide |
| Ethyl Mercaptan | n-Butyl Mercaptan |
| Dimethyl Sulfide | Dimethyl Disulfide |
| Carbon Disulfide | 3-Methylthiophene |
| Isopropyl Mercaptan | Tetrahydrothiophene |
| tert-Butyl Mercaptan | 2, 5-Dimethylthiophene |
| n-Propyl Mercaptan | 2-Ethylthiophene |
| Ethyl Methyl Sulfide | Diethyl Disulfide |

TABLE 2

| Organic nitrogen compounds |
| --- |
| Primary amines |
| secondary amines |
| tertiary amines |
| pyridines |
| amides |
| ammonia |

TABLE 3

| Organic oxygen compounds (oxo-hydrocarbon compounds) |
| --- |
| primary alcohols |
| carboxylic acids |
| aldehydes |
| ketone compounds |
| phenolics |

Attempts have been made to reduce the production of the odor compounds and to reduce the release of the odor compounds from plants. Robinson, "Develop a Nose for Odor Control", *Chemical Engineering News,* October 1993 contains a generic disclosure of odor problems and conventional odor control using aqueous treatment compositions including $H_2O_2$, $FeCl_3$, $KMnO_4$, NaOH and others. Careful control over the organic materials within the plant and reduction of microbial populations within the plant have been attempted to reduce the generation of the odor compounds in the plant atmosphere. Attempts to scrub the odor compounds from the plant atmosphere have been made using a variety of simple absorptive and oxidizing scrubbing materials. Fragrance chemicals that simply mask the offensive odors have been tried. In fact, essential oils have been used previously as odor masking compounds.

Sodium hydroxide (NaOH), activated carbon are useful absorptives. Oxidizing materials such as ozone ($O_3$) have been used. Halogen oxidants including chlorine dioxide ($ClO_2$), sodium hypochlorite (NaClO) and others have been attempted. Some degree of success has been achieved using these oxidative materials to remove organic odor molecules from atmospheric effluents. While chlorine dioxide has had some success, chlorine dioxide is highly toxic, difficult to handle and must be generated on site. Such difficulties lead to substantial resistance to its use. Further, hydrogen peroxide is also known for odor control. Hydrogen peroxide by itself is not effective against a broad range of odor constituents without additional treatment materials. However, the application of oxidative technologies including ozone, hydrogen peroxide, chlorine dioxide and other oxidants have had some limited success. Chlorine and hypochlorite are commonly used but have drawbacks and are corrosive.

The use of peroxyacid materials in microbiological methods are also known. For example, Grosse-Bowing et al., U.S. Pat. Nos. 4,051,058 and 4,051,059 disclose peroxyacetic containing antimicrobial compositions. Stas et al., U.S. Pat. Nos. 4,443,342 and 4,595,577 disclose the treatment of waste water and waste gases containing dialkyldisulfides by metal catalytic oxidation of these compounds by means of a peroxide compound in an aqueous medium. Lokkesmoe, U.S. Pat. No. 5,409,713 teaches peroxyacetic materials as microorganism sanitizers or growth inhibitors in aqueous transport systems typically containing produce and large amounts of challenged soil load.

Fraser, in "Peroxygens in environmental protection", *Effluent and Water Treatment Journal*, June 1986 disclose that hydrogen peroxide ($H_2O_2$) can be used to reduce odor. Fraser only discusses microbial control with peroxyacetic acid and does not correlate odor control to peroxyacid treatment or concentration. Littlejohn et al., "Removal of $NO_x$ and $SO_2$ from Flue Gas by Peroxyacid Solutions", *Ind. Eng. Chem. Res.* Vol. 29, No. 7, pp. 1420–1424 (1990) disclose peroxyacids in removing nitric oxides and sulfur dioxide from coal fire derived flue gas.

Peroxyacetic acid, neat and in aqueous solutions containing peroxyacetic acid has a strong pungent oxidizing odor resembling but stronger than acetic acid. Such =materials have not been seriously considered as odor reducing materials because of the nature of its odor. The concern being that in any treatment process using a significant amount of peroxyacetic acid, the resulting treated effluent would inherently obtain the pungent odor of the peroxyacetic acid. Further, peroxyacetic acid solution inherently contain large amounts of acetic acid (HOAc).

Essential oils are known aromatic substances and have pleasant masking odors. However, many oxidizing compounds are adversely impacted by the presence of essential oils. Generally, the oxidizing agent is presumed to act to oxidize the essential oil, thereby causing the mutual destruction of their functional abilities. Because of the reactivity the art has avoided using essential oils with oxidizing agents. Consequently, there remains a need for enhanced odor reduction processes which are able to take advantage of the beneficial effects of essential oils without causing excessive damage to the oxidizing systems.

BRIEF DISCUSSION OF THE INVENTION

The invention involves a process for removing odor compounds from an atmospheric plant fluid effluent. In the process of the invention, the plant atmospheric or other effluent is contacted with an aqueous treatment solution containing a controlled amount of a peroxygen compound and one or more olefin compound that cooperate to reduce odor intensity. Sufficient peroxyacid is used to control odor but not contribute a peroxyacid or acid smell to the treated effluent. The process is typically conducted in a batch or continuous treatment mechanism such as a falling film contactor, a wet scrubber or venturi mechanism. A fluid effluent includes both a liquid and a gaseous effluent.

Surprisingly, the peroxygen is activity is enhanced by the olefin compound and is not destroyed by reaction with the olefinic unsaturation or essential oils at a rate that interferes with oxidative odor reduction. In contrast, chlorine or chlorine dioxide as used in the prior art are incapable of surviving contact with olefins as they rapidly lose their oxidizing capacity. Using a combination of a peroxyacid and an olefin, surprisingly, allows the olefin to behave as an odor chemical reactant that augments the oxidative capacity of the peroxyacid; especially towards nitrogen and sulfur containing malodorous compounds.

Accordingly, the invention can be found in a process for removing an odor from an atmospheric effluent, the process comprising contacting an atmospheric effluent comprising an odor component with an aqueous peroxygen treatment composition and one or more olefin compounds, forming an oxidized odor component and dissolving the oxidized odor component or an odor component in the aqueous treatment composition to form a used treatment; and removing at least a portion of the used treatment.

Further, the invention may also be found in a process for removing an odor from a liquid effluent, the process comprising contacting the liquid effluent comprising an odor component with an aqueous peroxygen treatment composition and one or more olefin compounds, forming a combined effluent and aqueous treatment composition having reduced odor; and removing at least a portion of the combined composition.

In the treatment of gaseous effluent, when a gaseous atmospheric effluent gas phase contacts the finely divided aqueous treatment phase, oxidizable odor molecules from the gas phase react with the oxidizing peroxyacetic acid material in the aqueous treatment, are chemically converted into freely soluble compounds and is scrubbed from the gas phase. Specifically, the gas molecules contact a liquid droplet, the odor causing compounds transfer from the gas phase into the liquid phase and are then reacted with the peroxyacetic acid and/or essential oil/olefin to form water soluble, low volatile compounds. Other soluble components of the gas phase simply are solubilized in the acidic aqueous phase. The resulting atmospheric effluent has a substantially reduced concentration of odor compound or composition and has a less objectionable odor level. For the purpose of this application, the term "peroxygen compound", "active oxygen", active species" and "active ingredients" are substantially synonymous and refer to the total concentration of peroxide, peroxyacid or other available oxidizing species in a treatment that can oxidize the odor molecules or components.

The term "atmospheric effluent" relates to any gaseous stream emanating from an industrial plant, agricultural facility, hospital, institutional kitchen, doctors office, household kitchen, etc. processing organic materials that result in the release of odor molecules into the atmospheric effluent. The atmospheric effluent can contain a large variety of odoriferous or odor causing chemicals or molecules including oxo-hydrocarbons, organo sulfides or organic thiols (mercaptans), monoamines, diamines, triamines, ammonia, alcohols, phenolics, formaldehyde, acetaldehyde, skatole, carbon disulfide and hydrogen sulfide and other odor forming oxidizable organic compounds. Such an atmospheric effluent typically is released in a flume that moves with the atmosphere and slowly mixes into the atmosphere, becomes diluted and dispersed into the environment.

Further, not only does the peroxygen compound (a peroxyacid such as peroxyacetic acid) result in the oxidation of odor components into freely soluble materials that remain in the aqueous phase, we have found that the use of such an acidic material results in the absorption of organic bases such as ammonia and amines resulting in the effective scrubbing of these compounds from the atmospheric effluent material. Additionally, it is now shown that the combinations of peroxyacids and an olefin allows for simultaneous masking and enhanced malodor removal. In large part the process is designed to favor the mass transfer of odor compounds into the aqueous treatment.

BRIEF DISCUSSION OF THE DRAWINGS

DETAILED DISCUSSION OF THE INVENTION

Figure 1:
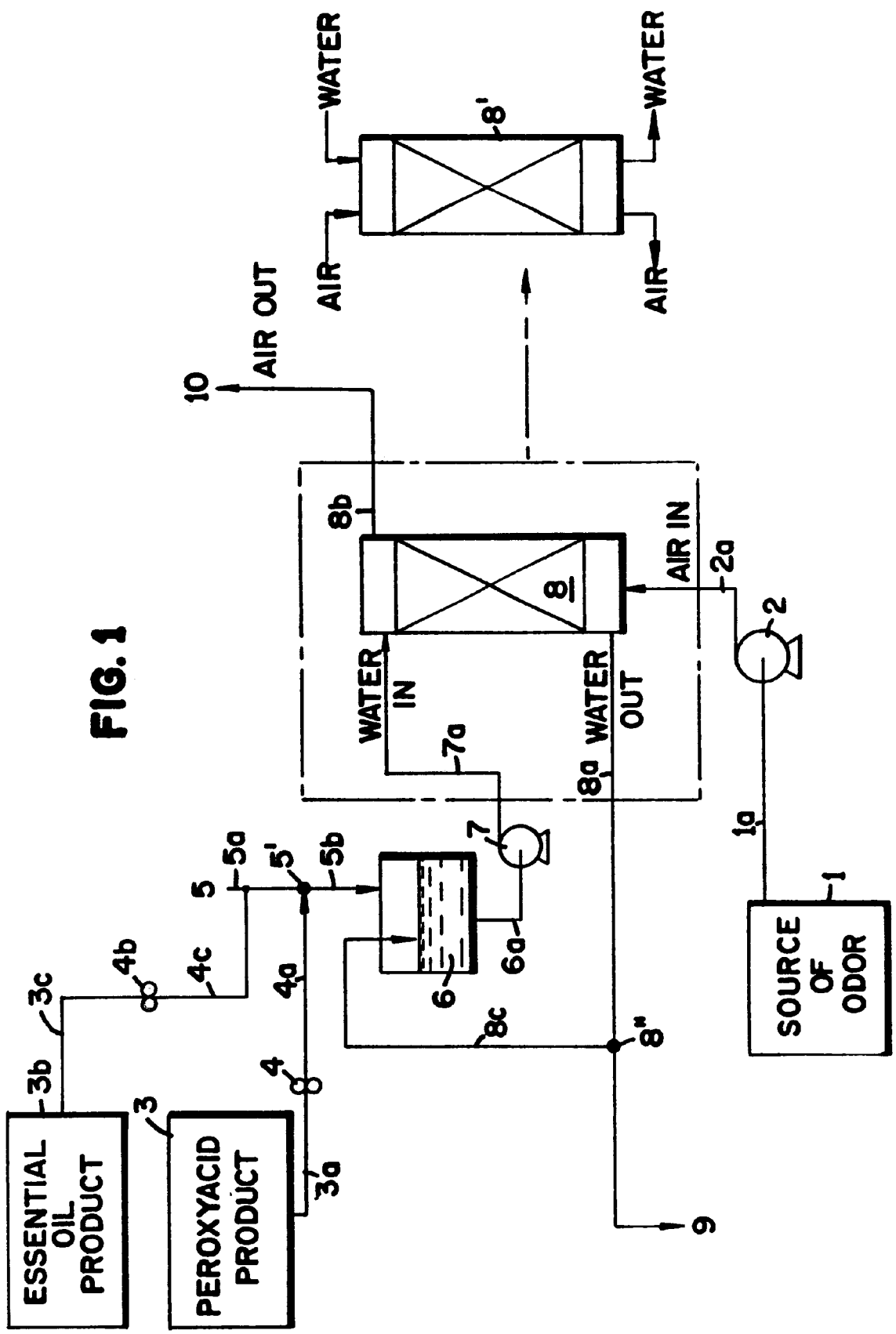
FIG. 1 shows a block diagram of the process of the invention, including a source of oxidant, a source of odor and effluent, a cocurrent scrubber apparatus or a counter current scrubber apparatus, the aqueous treatment and the resulting waste aqueous stream.

The process of the invention uses absorption, more specifically a gas/liquid absorption, a liquid/liquid absorption or solid particulate/liquid absorption, during and after an oxidative reaction to separate odor components from a fluid effluent. Both odor and particulate materials can be absorbed by the oxidizing liquid stream, the stream comprising a peroxygen compound and an olefin compound. In the process, absorption is driven by the solubility of the odor compounds, and oxidized odor materials, in the aqueous phase. At the same time, a chemical reaction between an aqueous stream and a gas stream results in washing or scrubbing oxidized odor compounds or compositions from the effluent with the liquid composition. As a result of the chemical reaction between the odor molecules in the stream and the treatment liquid, one or more of the oxidized constituents of the gas mixture will preferentially dissolve in the liquid and can thus be efficiently removed. In treatment of gaseous odor, the gas constituent reacts with the oxidant to form a highly water soluble material which forms a physical solution in the liquid and is removed from the gas stream.

Such a gas absorption is preferably carried out in a device where intimate contact between a gas phase and a finely divided liquid phase or a finely divided gas phase and a liquid phase is obtained. Such devices, including sparged and agitated vessels and the various types of tray towers, can contact a gas phase with a liquid and can disperse the gas phase into bubbles or foams. Tray towers are typically the most important of these since countercurrent multistage contact and other contacting can be obtained. The gas can be contacted in the form of a finely divided or small bubble into a bulk liquid in a sparged vessel (bubble column). Finely divided gas or atmospheric bubbles can be dispersed into a mechanically agitated vessel in which the liquid contents are agitated to ensure close contact with the finely divided bubbles and the liquid. Multistage absorption can be obtained using multistage tray towers using a variety of towers, baffles, barriers, downspouts and other mechanical means to ensure close contact between the gas phase and the liquid phase. Venturi scrubbers can be used along with wetted-wall towers, spray towers and spray chambers, packed towers, and any other countercurrent or cocurrent apparatus that can ensure close contact between the atmospheric or odor containing gas phase and the liquid treatment. The process can be run either continuous or in semibatch or batch mode. During the process, the accumulated treatment composition containing a substantial quantity of the odor compounds and the oxidized odor compounds are removed from the process equipment and directed to typically on-site treatment or municipal sewage treatment plants. In smaller applications, or liquid/liquid applications a venturi system is preferred while in larger applications, a countercurrent scrubber towers can be preferred.

In a countercurrent column, the oxidative agent and olefin compound solution is fed in the top of the absorber and the effluent or gas mixture enters from the bottom. The odor components of the gas reacts with and dissolves in the liquid treatment composition. The aqueous treatment composition containing the oxidized odor generating substances is removed from the bottom of the column. Conversely, in a cocurrent column both streams enter the column at one end and depart at the opposite end. In either case, the resulting treatment solution containing the scrubbed materials is then treated in an industrial, agricultural or municipal waste water treatment facility.

The vertical absorber may be a packed column operating either countercurrently or cocurrently, plate column operating either countercurrently or cocurrently, a falling film contactor or a simple spray absorption column operating cocurrently. Preferred packed columns can be shell filled with packing material designed to disperse the liquid and bring the liquid in finely divided form in close contact with the rising effluent stream. Packed columns offer simple and cheap construction and are preferred for complex or corrosive gases because packed columns can be made from ceramics or other non reactive packings. In plate towers, liquid flows from plate to plate in a cascade fashion while the effluent gas bubbles through the flowing liquid within each plate through a multitude of dispersing means or through the cascade of liquid as in a shower deck tray. These absorbers are used where tall columns are required.

The fundamental physical principles underlying the absorption of the odor molecules from the plant atmospheric effluent in a gas absorption reaction mode relates to the solubility of the reaction product between the peroxygen compound—oxidant liquid phase and the gas molecules. The rate of mass transfer is high (odor removal is efficient) because the reaction product, between the odor molecules and the organic peroxygen compound oxidant, comprises molecules such as sulfate, alcohol, aldehyde, carboxylic acid and salts, ammonium ion ($NH_4+$), protonated amines and other similar species which are highly soluble in water solutions particularly at acid pH. Since these oxidized and other non-oxidized materials are highly soluble in the aqueous treatment solutions, mass transfer principles tend to favor the dissolution of such materials in the aqueous treatment composition and result in highly efficient odor molecule scrubbing. The treatment compositions useful in the processes of the invention are adapted for use in commonly available scrubber systems. Such systems can be obtained from a variety of manufacturers including EST Corp., D.R. Technology, Inc., PEPCO and VIATEC. In smaller applications, a venturi contactor may be preferred.

The aqueous treatment compositions can be introduced into the wet scrubber in the form of a simple aqueous stream, an agitated stream, or a spray having an effective concentration of a peroxygen treatment composition. Useful peroxygen compounds are compounds containing at least one oxygen atom of heightened oxidation state. Often peroxy compounds have two or more oxygen compounds in a similar grouping having enhanced bond energies. Simplest peroxygen compounds include hydrogen peroxide but can include inorganic peroxides, organic peroxides and other peroxygen compounds. Briefly, inorganic peroxides include persulfates, hydrogen peroxide ($H_2O_2$), sodium peroxide, bivalent metal peroxide, ammonium persulfate, peroxy monosulfate, peroxy diphosphate, hydrogen peroxide having a hydrogen peroxide concentration of up to 90 wt % and more in aqueous solution, sodium peroxide, barium peroxide, calcium peroxide, magnesium peroxide, strontium peroxide, zinc peroxide, sodium perborate, sodium perborate hydrate, di t-butyl peroxide, dibenzylyl peroxide, cumin peroxide, other organic peroxides and hydrogen peroxide addition compounds. Organic peroxides include peroxy acetic acid, dibenzylyl peroxide, and cumin peroxide.

This list of peroxygen compounds is not exhaustive and other peroxygen compounds may be utilized in the cooperative processes of the invention wherein the peroxygen compound cooperates with the olefin material to provide odor reduction in the atmospheric effluent.

The treatment compositions can comprise a peroxyacid, preferably peroxyacetic acid having the formula:

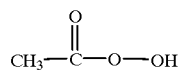

The peroxyacid is an unstable composition that is typically made by the direct acid catalyzed equilibrium oxidation reaction between 5 to 98 wt % hydrogen peroxide in contact with the liquid carboxylic acid, typically acetic acid or by auto-oxidation of aldehydes, acid chlorides, carboxylic anhydrides with hydrogen peroxide or other peroxy oxidizing compositions.

In treating liquid effluents, a batch or continuous treatment can be used. In batchwise treatment the effluent can be treated in large stirred tanks. In continuous treatment, the effluent can be treated by a continuous stream of peroxyacid that can be added in a pumped or metered treatment. One common metering scheme is to add the treatment using a venturi. In a venturi the passage of the effluent past a venturi causes the treatment to be drawn into the effluent. The ratio of addition can be controlled by a selected venturi or metering means.

Preferably, the process of the invention includes the use of a combination of peroxyacid, hydrogen peroxide and carboxylic acid. The compositions of the invention contain water, peroxyacetic acid, hydrogen peroxide and acetic acid across a relatively broad range of concentrations. Peroxyacetic acid is a freely water soluble liquid having a pungent, acrid odor resembling acetic acid, but with a strong oxidizing character. The antimicrobial compositions of the invention also comprise a proportion of hydrogen peroxide. Hydrogen peroxide in combination with the peroxyacid, preferably peroxyacetic acid, provides a surprising level of successful odor scrubbing capacity when compared to conventional scrubbers. Hydrogen peroxide apparently provides an effervescent action in the treatment composition that tends to help in providing finely divided aqueous treatment particles that improve oxidation by the peroxyacid and absorption through small particles with large surface area. The concentration of hydrogen peroxide is adjusted with respect to the concentration of carboxylic acid and water to ensure that the treatment composition contains preferably greater than about 1 ppm, preferably about 1 to 1000 ppm of residual or active peroxyacetic acid in the treatment composition for highly efficient odor molecule scrubbing. The concentration of the active ingredients in the treatment composition can be adjusted using make-up amounts of the concentrate material delivered to the continuously flowing aqueous stream during processing.

The oxidative composition may also comprise any number of functional and non-functional adjuvants. Specifically, the compositions may comprise stabilizing agents, wetting agents, as well as pigments or dyes among other constituents. Stabilizing agents may be added to the composition to stabilize the peroxyacid and hydrogen peroxide to prevent the premature decomposition of the oxidizing material within the composition. Chelating agents or sequestrants are generally useful in the compositions in the form of alkyl diamine polyacetic acid-type chelating agents such as EDTA, acrylic and polyacrylic acid-type agents, phosphonic acid, and phosphonate-type chelating agents among others. Preferred sequestrants include phosphonic acid and phosphonic acid salts including 1-hydroxyethylidene-1,1-diphosphonic acid, amino[tri(methylenephosphonic acid)] and other phosphonate based sequestering agents. Also useful in the compositions are surfactant, wetting or defoaming agents. Wetting agents function to increase the surface area and reduce particle size of the particulate aqueous treatment composition. Such wetting agents are known within the art to raise the surface activity of the composition. Preferred wetting agents are low foaming nonionic surfactants which may be used comprising ethylene oxide moieties, propylene oxide moieties as well as a mixture thereof and EO-PO heteric or block compositions. Defoaming agents comprising silica, silicones, aliphatic acids or esters, alcohols, sulfates, sulfonates, amines, amides, nonionic materials and others can be helpful in defoaming the mixture during processing. The treatment compositions may contain a number of other constituents selected by the operator to enhance the properties of the materials.

We have found that the combination of an olefinic compound or material with the oxidant materials of the invention can substantially improve odor reduction. Olefinic materials useful in the invention comprise preferably liquid or solid materials that are soluble or dispersible in aqueous media or alternatively can be useful in forming an aqueous treatment solution with the oxidant used in the odor reduction processes of the invention. Typical molecular weights for such materials can range from 80 to about 5000 and higher. Preferably, the materials are relatively low VOC. The primary requirement for the olefin material used in the invention is the presence of at least one vinyl or ethylenic unsaturation in an organic molecule. Such unsaturation can be olefinic or acetylinic. The preferred olefinic group includes

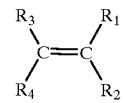

wherein $R_1$, $R_2$, $R_3$ and $R_4$ are independently selected from the group consisting of hydrogen, alkyl, halo, nitro, carboxyl, or any other recognizable substituent for a vinyl carbon including such R groups representing a cyclic group, a polymer, an aliphatic group or portions of other organic molecules. Such olefinic materials can be monomeric, oligomeric, polymeric, linear polymers, branched polymers, or other such structure. Preferred classes of the olefinic compound are set forth in the following Table 4:

TABLE 4

Preferred Olefin Compounds
The treatment compositions can also contain an olefinic compound that can cooperate with the peroxygen compound in odor reduction. These materials are normally liquid or solid at about 25° C.

| Olefin Class | Specific Exemplary Molecules |
| --- | --- |
| LMW unsaturated carboxylates | • acids and/or salts and/or esters and/or anhydrides of fumaric, maleic, itaconic, acrylic, methacrylic, glutaconic, citraconic, mesaconic, tricarballyic, sorbic, vinyl acetate, methyl acrylate, etc., and mixtures thereof. |
| HMW unsaturated carboxylates and surfactants | • acids and/or salts and/or esters and/or anhydrides of undecylenic, tall oil, ricinoleic, abietic, oleic, linoleic, linolenic, aliphatic or unsaturated substituted (octenyl) succinic anhydride, sulfonated or sulfated oleic acid, ethoxylated castor oil, and mixtures thereof. |
| Glycerides | • unsaturated mono, di, and triglycerides like triolein, castor oil, soy oil, etc. |
| Olefins and Polyolefins | • Polyolefin wax (Epolene C-10 Wax) Eastman Chem. Co.<br>• polyolefin wax (AC-325 flake) Allied Chemical<br>• poly alpha olefins (Synton ® PAO 40) Uniroyal Chemical<br>• Pine Oil Extender (DF-110) Exxon Chemical<br>• $C_{6-30}$ alpha and internal olefins, various suppliers like Sasol Chemical Industries Limited, Amoco Chemicals, IFP |

The compositions can contain an olefin compound in the form of one or more essential oils, which are generally defined as distillable (b.p. 150° F.) odoriferous products of plant origin. While the principle components are mono- to tetra-unsaturated olefin terpenes, essential oils may also contain benzenoid and aliphatic compounds as well including alcohol, ether, carbonyl, etc. functionality. Terpenes are unsaturated hydrocarbons which are based on the isoprene unit of alternating double bonds. Terpenes of use in the invention include citral, camphor, α and β-pinene, terpineol, limonene, α and β-terpinene, α and β-phellandrene, cedrene, geraniol, linalool, neral and abietic acid. Especially preferred terpenes include citral, camphor, α and β-pinene, terpineol and limonene. Preferred essential oils can also include such aldehydes as benzaldehyde and cinnamaldehyde.

The treatment compositions can comprise a one part or a two part concentrate. Typical two part concentrate materials that fall within the following generic formula of Tables 5 and 6:

TABLE 5

Treatment Concentrate 1

| Ingredient | Useful Wt % | Working Wt % | Preferred W % |
| --- | --- | --- | --- |
| Peroxyacid | 1–40 | 2–30 | 4–20 |
| Hydrogen Peroxide | 1–50 | 3–40 | 5–30 |
| Carboxylic Acid | 1–90 | 3–60 | 5–40 |
| Sequestrant | 0.1–10 | 0.1–5 | 0.5–2 |
| Water | Balance | Balance | Balance |

TABLE 6

Treatment Concentrate 2

| Ingredient | Useful Wt % | Working Wt % | Preferred W % |
| --- | --- | --- | --- |
| Olefin Compound | 10–100 | 50–100 | 80–95 |
| Mineral Spirits | 0–80 | 0–20 | 0–15 |
| Surfactants | 0–20 | 0–10 | 0–5 |

The above compositions that can be co-injected comprise concentrate materials that can be metered into an aqueous stream directed to the scrubber apparatus. An oxidative concentrate such as treatment concentrate 1 can be metered into an aqueous stream along with separately added olefin composition (such as treatment concentrate 2) in an amount forming a residual concentration containing about 1 to 1000 ppm peroxyacid, 1 to 2,000 ppm hydrogen peroxide, 1 to 600 ppm of carboxylic acid (e.g. acetic acid) and other active components, about 1 to 10,000 ppm of essential oil/olefin, preferably about 30 to 150 ppm peroxyacid, 1 to 500 ppm hydrogen peroxide, 1 to 300 ppm of carboxylic acid and other active components and 10 to 500 ppm of essential oil/olefin. As a general guideline, the following Table 7 sets forth working ranges of active ingredients in the treatment composition after dilution in the aqueous stream within the wet scrubber. These residual concentrations can be formed from a one part or a two part concentrate as shown:

TABLE 7

Residual or Active Concentrations in the Treatment

| Treatment Constituent | Useful (ppm) | Working (ppm) | Preferred (ppm) |
| --- | --- | --- | --- |
| Peroxyacid | 1–1,000 | 5–300 | 30–150 |
| Hydrogen Peroxide | 1–2,000 | 1–1,000 | 1–500 |
| Carboxylic Acid | 1–600 | 1–400 | 1–300 |
| Sequestrant | 0.01–50 | 0.01–25 | 0.01–10 |
| Olefin/Essential Oil | 0.1–10,000 | 1–1,000 | 5–500 |
| Water | Balance | Balance | Balance |

Another way to view composition ranges is to use ratios between various critical components. The first important ratio is that between the peroxyacid and the carboxylic acid. The aqueous peroxyacid fog treatment composition comprises less than 4 parts by weight, preferably less than 2.5 parts by weight, of carboxylic acid per each part of peroxyacid.

The second important ratio is that between hydrogen peroxide and the peroxyacid. The aqueous peroxyacid fog treatment composition comprises less than 5 parts by weight of hydrogen peroxide per each part of peroxyacid, preferably less than 2 parts by weight of hydrogen peroxide per each part of peroxyacid.

Because active oxygen can come from more than one source, it is also important to consider the total active oxygen content. The aqueous peroxyacid fog treatment composition comprises a dosed peroxyacid and hydrogen peroxide concentration resulting in an active oxygen concentration of less than about 400 parts by weight of active oxygen per one million parts of the treatment, preferably less than about 270 parts by weight of active oxygen per one million parts of the treatment and more preferably less than about 150 parts by weight of active oxygen per one million parts of the treatment.

A particularly aqueous peroxyacid fog treatment composition comprises a concentrate that comprises 1 to 90 weight percent (wt %) of acetic acid, 1 to 50 wt % of hydrogen peroxide, a sequestrant, and 1 to 40 wt % of peroxyacetic acid. These concentrations are determined using the following formulas:

$$\text{Dosed Concentration} = \frac{\text{grams of active ingredient added}}{\text{grams of liquid solution}}$$

$$\text{Residual Concentration} = \frac{\text{grams of active ingredient detected by analysis after reaction}}{\text{grams of liquid solution}}$$

During operations, in removing odor compositions from an effluent stream, a continuous stream of the treatment composition is directed to the top of a scrubber column. The treatment composition flows counter-currently through the column to scrub odor compositions from the effluent gas. It is possible, however, to accomplish this using co-current flow if using a packed column or spray chamber. To maintain an effective concentration of the peroxyacid, preferably peroxyacetic acid in the treatment composition, a make up amount of the concentrate must be either continually or intermittently added to the continuous stream to maintain at least about 1 ppm of residual peroxyacid, preferably at least about 20 and more preferably at least 35 ppm of residual peroxyacid during operations.

Exemplary peroxyacetic acid formulas (equilibrium mixtures) include those in Tables 8 to 11:

TABLE 8

| Ingredient | Wt % |
| --- | --- |
| Acetic Acid | 32.0 |
| Hydrogen Peroxide | 11.1 |
| Sequestrant | 1.5 |
| Peroxyacetic Acid | 15.0 |
| Water | balance |

TABLE 9

| Ingredient | Wt % |
| --- | --- |
| Acetic Acid | 6.5 |
| Hydrogen Peroxide | 26.6 |
| Sequestrant | 1.0 |
| Peroxyacetic Acid | 4.7 |
| Water | balance |

TABLE 10

| Ingredient | Wt % |
| --- | --- |
| Acetic Acid | 30.0 |
| Hydrogen Peroxide | 7.0 |
| Sequestrant | 1.0 |
| Peroxyacetic Acid | 5.0 |
| Peroctanoic Acid | 0.5 |
| Hydrotrope (coupling agent) | 5.0 |
| Octanoic Acid | 3.0 |
| Water | balance |

TABLE 11

| Ingredient | Wt % |
| --- | --- |
| Acetic Acid | 46.0 |
| Hydrogen Peroxide | 4.0 |
| Sequestrant | 1.0 |
| POAA (Peroxyacetic acid) | 12.0 |
| POOA (Peroxyoctanoic acid) | 2.0 |
| Octanoic Acid | 8.2 |
| Water | balance |

During operations to maintain the concentrations of the peroxyacid mentioned above, the exemplary peroxyacid formulations are typically dosed as make-up to the treatment streams at rates of about 100 to 2000 ppm of the peroxyacetic acid formulations in the aqueous stream typically flowing as make-up water at the rate of about 1 to 10,000 L-min$^{-1}$. The use of make-up solution directed to the continuously flowing treatment stream is a preferred means to introduce the peroxyacetic acid material into the scrubber or venturi apparatus.

Process Parameters

In the odor reduction treatment process of the invention, an aqueous solution is passed in a continuous stream through the scrubber apparatus. In typical applications, the aqueous treatment composition passes through the scrubber at a rate of about 1 to 10,000 L-min$^{-1}$, depending upon the size of the scrubber. Typically, the scrubber is a vertical wet scrubber having interior packing. The aqueous solution passes through the column packing in a finely divided form comprising streams, droplets, etc. through the column packing. The rate of solution flow is adjusted depending upon the size of the scrubber, the volumetric flow rate of gas, and the soil level of the gas.

The aqueous treatment material is added to the continuously flowing aqueous stream in make-up water. The aqueous peroxyacid material, preferably peroxyacetic acid, is typically added in a concentrate at a dosed concentration of about 1 to 1000 ppm, preferably about 30 to 150 ppm of peroxyacetic acid to make-up water added to the aqueous stream at a rate of about 1 to 500 liters per hour. The effective residual concentration of peroxyacid, preferably peroxyacetic acid, in the aqueous stream is maintained between 1 and 1,000 ppm peroxyacetic acid, preferably about 1 to 150 ppm peroxyacetic acid, most preferably about 30 to 80 ppm peroxyacetic acid. The effective concentration of essential oil/olefins is maintained at a concentration of 1 to 10,000 ppm, preferably 10 to 500 ppm. The atmospheric effluent from the plant atmosphere is passed through the scrubber at a rate of about 100 to 3 million liters of atmospheric effluent per minute (atmos. L-min$^{-1}$). The temperature of the scrubber is maintained at ambient temperatures, however, somewhat elevated temperatures can enhance the oxidation and dissolution of the gas in the liquid stream. The wet scrubber can be operated continually at such ratios to efficiently remove odor compounds from the atmospheric stream. The odor compounds and oxidized odor compounds remain solubilized in the aqueous phase. After the odor reduction process is used for some period, the odor compounds are removed with a portion of the aqueous stream that can be removed from the scrubber continually. Such a proportion of the aqueous stream can comprise about 1 to 500 liters of the aqueous stream per hour (L-hr$^{-1}$). Alternatively, the aqueous stream can be removed batchwise or in its entirety periodically, e.g. every 4, 6, 12 or 24 hours, bi-weekly, weekly, etc. The process can then be restarted with fresh water and fresh treatment chemicals. The aqueous product of the treatment process is a relatively dilute solution of the treatment chemicals, sulfates, ammonia, alcohols, aldehydes and other common waste water components. The aqueous effluent resulting from the process is compatible with most industrial and municipal waste treatment facilities which can treat the aqueous effluent rendering it innocuous to the environment.

In general, one cubic foot of plant atmospheric effluent is contacted with about 0.01 to 10 liters of aqueous treatment solution. Preferably, at least about 20% of an odor forming compound selected from the group consisting of an oxo-hydrocarbon, organomercaptan, an amine, ammonia, hydrogen sulfide or mixtures thereof, is absorbed and removed in the process from the plant atmospheric effluent and wherein the odor threshold is reduced by at least 20%.

DETAILED DISCUSSION OF THE FIGURES

FIG. 1 demonstrates the process of the invention, including a source of oxidant, a source of odor and effluent, the scrubber apparatus, the aqueous treatment and the resulting waste aqueous stream. A detailed description is as follows:

The source of the odor 1, which can be a large processing plant or as small as a kitchen, is typically an industrial plant or agricultural installation that handles large quantities of organic material, such as meat packing plants, animal rendering plants, composting plants, paper mills, sewage treatment plants, hog farms, dairy farms and other similar installations generate large quantities of odors that typically exit the plant in an odor contaminated atmospheric effluent flume. The air from this source is fed as stream 1a into an air fan or pump 2, which then blows air into the scrubber tower 8 as stream 2a. Holding tank 3a is used as the source of peroxyacetic acid, acetic acid and hydrogen peroxide while tank 3b holds a source of essential oil/olefins. Holding tank 3a may actually be a series of holding tanks, as needed. These chemicals flow as streams 3a and 3c to the dosing pumps 4 and 4b, which are used to add chemicals to the aqueous streams 4a and 4c as needed. A source of clean water 5 is used as needed to add or make up water to the water in the aqueous stream via pipeline 5a, which flows to mixing valve 5'. From this valve, the correctly mixed aqueous stream 5b, is directed to the holding tank 6. Tank 6 can be incorporated into the bottom of tower 8 if convenient. From this tank 6, the aqueous stream 6a flows to a water pump 7 which provides the necessary pressure to force the aqueous stream 7a through the scrubber tower 8 at the desired rate.

The scrubber tower 8 is used to provide the necessary contacting area between the peroxyacid containing aqueous stream 7a and the odor-causing compounds within the gaseous phase 2a. The tower operates countercurrently, meaning that the aqueous stream 7a enters at the top and exits the bottom while the air stream 2a enters the bottom and exits at the top. The air stream 8b exiting the top of the tower flows to an optional stack 10. The aqueous stream 8a exiting the bottom of the tower flows to diverter valve 8", which recycles a portion of the aqueous flow back to the holding tank 6 while diverting the remainder as waste stream 9. Alternatively, the contacting column 8' can also operate cocurrently.

Figure 2:
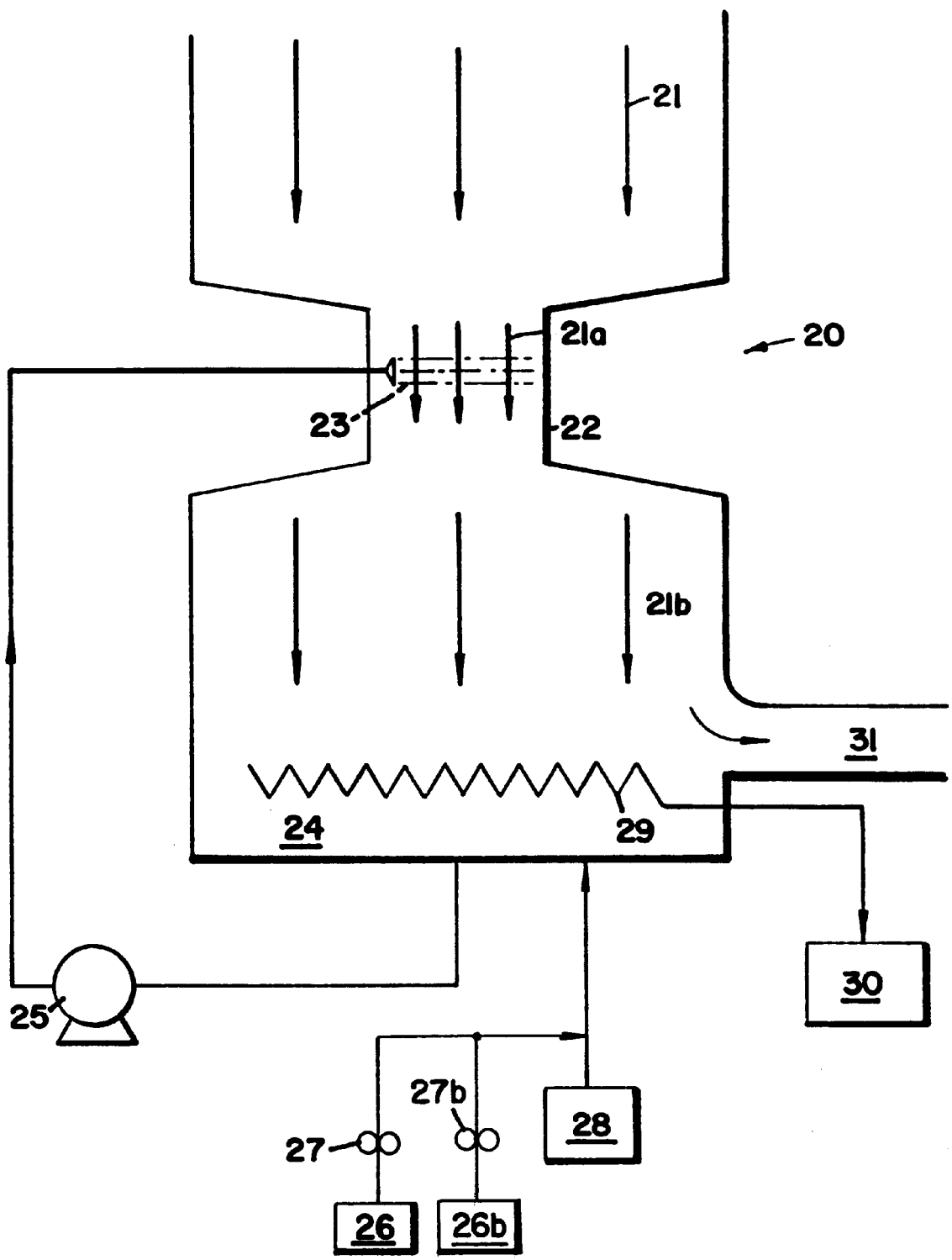
FIG. 2 shows a venturi used as a means to contact the odor laden atmospheric or liquid effluent with the aqueous peroxyacid composition.

FIG. 2 shows a generally a venturi system 20 that can be used to contact either odor laden air or a liquid effluent with the peroxyacid and essential oil/olefin treatment. This installation can be used in smaller locations such as hog barns, effluent lagoons, etc. In FIG. 2, odor laden fluid, air or liquid, 21 enters the venturi 20. The fluid 21 enters the restricted area 22, in the venturi 20, that produces an area of increased speed and reduced pressure. In the restricted area 22 the odor laden fluid 21a is contacted with the spray 23 from a source of peroxyacid and essential oil/olefin treatment 24. The treated fluid 21b with reduced odor exits the venturi 20 at vent or air exit 31. The treatment solution 24 is directed to the venturi 20 restricted area 22 using pump 25. Make-up water results from water source 28. Make up peroxyacid (peroxyacetic acid) and essential oil/olefins are provided by source 26a and 26b and metering pumps 27a and 27b. Over flow or excess treatment solution is drawn off by overflow means 29 to a sewage treatment zone 30. The fluid 21 can be forced into the venturi 20 or can be drawn from the venturi 20 from the vent 31.

Figure 3:
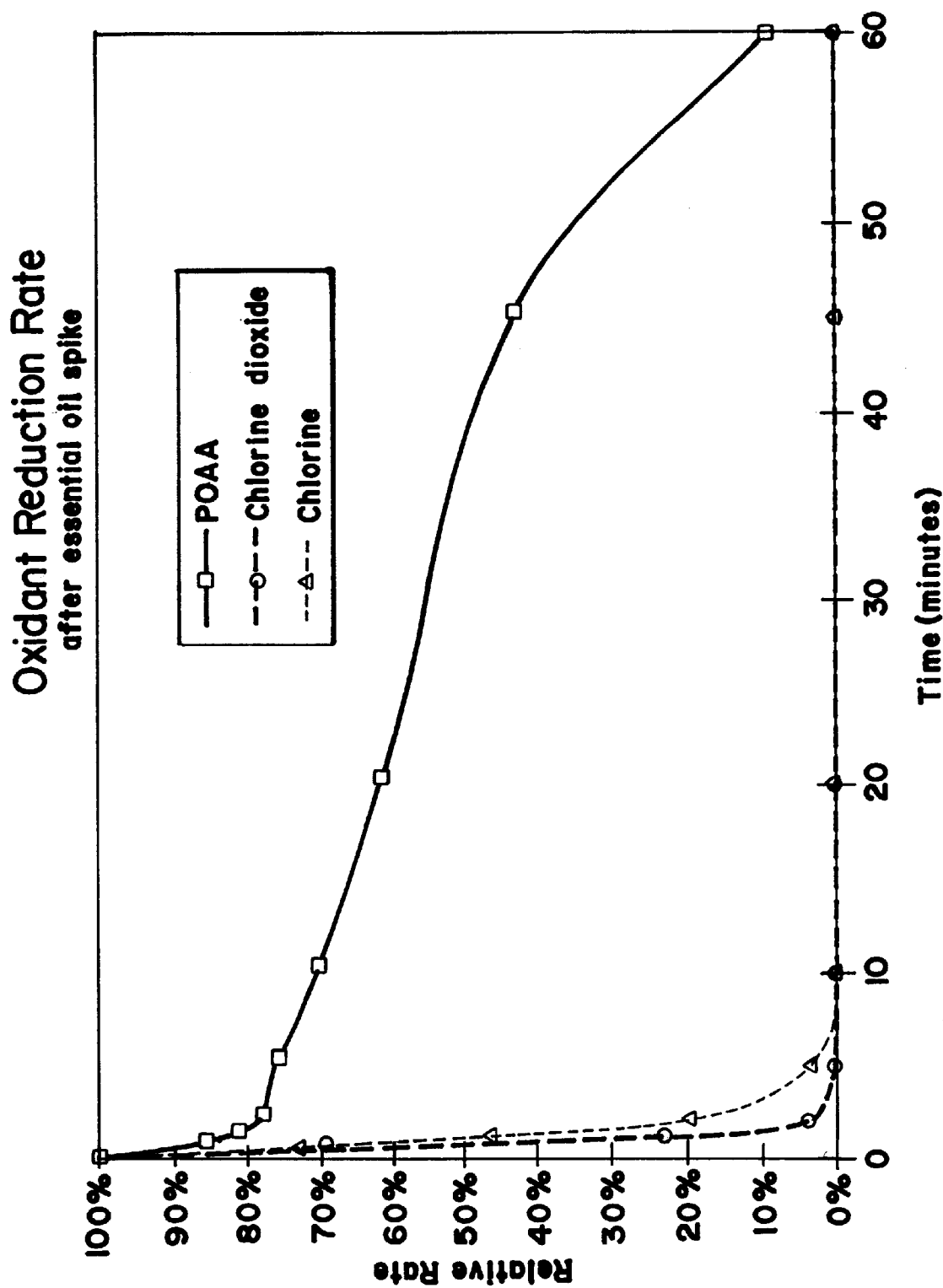
FIG. 3 is a graphical comparison of the oxidant survival rate in the invention treatment method of using peroxyacids co-injected with essential oil/olefins versus previously used oxidative systems.

FIG. 3 is a graphical comparison of the oxidant survival rate in the invention treatment method of using peroxyacids co-injected with essential oil/olefins versus previously used oxidative systems. As seen in the figure, upon spiking an essential oil/olefin (pine oil) into a conventional treatment system such as chlorine or chlorine dioxide, the loss of oxidant is rapid; with essentially complete elimination within about five to ten minutes. This rapid oxidant loss would negate the use of simultaneous essential oil/olefin addition. In contrast, the peroxyacid rate of decay is much lower with a small residual remaining even after one hour. This demonstrates the unexpected synergistic effect resulting from the combination of the peroxyacids with the essential oil/olefins.

WORKING EXAMPLE #1

The objective of this example was to compare the prior art treatment of using peroxyacids alone with the improved and synergistic method of co-injecting peroxyacids and essential oils for odor elimination. Table 12 compares the results of using synergistic blends of peroxyacids and essential oils (experiments 5–7) versus control treatments of using either alone (experiments 1–4).

TABLE 12

| Peroxyacid Treatment Condition | Peroxyacid Concentration (ppm) | | Pine Oil[1] Concentration (ppm) | | Tower[2] Odor Rating (1–10, 10 = best) | |
|---|---|---|---|---|---|---|
| | Cooker | Raw | Cooker | Raw | Cooker | Raw |
| Control Studies | | | | | | |
| 1 peroxyacetic acid[3] | 60 | 90 | 0 | 0 | 5.0 | 6.0 |
| 2 peroxyacetic acid[3] | 120 | 90 | 0 | 0 | 5.0 | 5.0 |

TABLE 12-continued

| Peroxyacid | | Peroxyacid Concentration (ppm) | | Pine Oil[1] Concentration (ppm) | | Tower[2] Odor Rating (1–10, 10 = best) | |
|---|---|---|---|---|---|---|---|
| | Treatment Condition | Cooker | Raw | Cooker | Raw | Cooker | Raw |
| 3 | pine oil[1] | 0 | 0 | 62 | 62 | 2.5 | 3.0 |
| 4 | pine oil[1] | 0 | 0 | 125 | 125 | 3.0 | 3.0 |
| | Invention Examples | | | | | | |
| 5 | peroxyacetic acid + pine oil[1] | 120 | 90 | 125 | 125 | 7.9 (45 min.)[4] | 8.9 (45 min.)[4] |
| 6 | peroxyacetic acid + pine oil[1] | 60 | 90 | 62 | 62 | 8.0 (50 min.)[4] | 8.5 (45 min.)[4] |
| 7 | peroxyacetic acid + pine oil[1] | 50 | 105 | 4 | 4 | 8.0 (7 min.)[4] | 8.0 (45 min.)[4] |

[1] Pine oil from a mix of pine terpenes and mineral spirits.
[2] Odor Rating from olefactory analysis subjective scale of relative intensity.
[3] Peroxyacetic Control as per U.S. Pat. No. 6,015,536.
[4] Time duration of treated synergistic effect.

The above data shows that synergistic blends of peroxyacids and essential oil/olefins are noticeably more effective than either tested alone. Experiment 7 shows that even a minor amount of essential oil/olefin has a beneficial effect. The use of peroxyacid alone does little to eliminate malodors while the use of pine oil alone is a poor masking agent. Thus, it was found that when using peroxyacids alone a musty-bitter smell remains after treatment of a carcass cooker scrubber, and a sewery-pine smell is achieved if pine oil is used alone. However, if both odor treatment components are co-added, an extremely low intensity pine smell is found with no musty/sewery/bitter components to it; i.e., the addition of both the essential oil/olefin and peroxyacid creates an almost "no smell" situation with a hint of the essential oil.

WORKING EXAMPLE #2

This example demonstrates the use of mixed essential oils for enhanced odor controls using peroxyacids in an industrial rendering plant cooker scrubber.

TABLE 13

| | | Odor Evaluation[1] | | | |
|---|---|---|---|---|---|
| | | | | Odor Rating (1–10, 10 = best) | |
| | Treatment Condition | Peroxyacid Concentration (ppm) | Essential Oil Concentration (ppm) | Relative Malodor Intensity[2] | Relative Odor Detection[3] |
| | Control Studies | | | | |
| 1 | Peroxyacetic Acid[4] | 30 | 0 | 3 | 2 |
| 2 | Peroxyacetic Acid[4] | 100 | 0 | 5 | 5 |
| 3 | α-Pinene/Benzaldehyde[5] | 0 | 20 | 1 | 1 |
| 4 | α-Pinene/Benzaldehyde[5] | 0 | 50 | 3 | 2 |
| 5 | α-Pinene/trans-cinnamaldehyde[6] | 0 | 50 | 4 | 3 |
| | Invention Examples | | | | |
| 6 | Peroxyacetic Acid + α-Pinene/Benzaldehyde | 30 | 20 | 6 | 7 |
| 7 | Peroxyacetic Acid + α-Pinene/Benzaldehyde | 50 | 20 | 8 | 8 |
| 8 | Peroxyacetic Acid + α-Pinene/Benzaldehyde[5] | 100 | 50 | 9 | 8 |
| 9 | Peroxyacetic Acid + α-Pinene/trans-cinnamaldehyde[6] | 100 | 50 | 9 | 9 |

[1] Odor rating from an industrial rendering plant olfactory analysis of relative intensities and detection thresholds.

TABLE 13-continued

Odor Evaluation[1]

| Treatment Condition | Peroxyacid Concentration (ppm) | Essential Oil Concentration (ppm) | Odor Rating (1–10, 10 = best) | |
|---|---|---|---|---|
| | | | Relative Malodor Intensity[2] | Relative Odor Detection[3] |

[2]) Odor intensity as measured by the rendering facility as "sharpness" of the malodors from the treated stack. Usually defined in the industry as the site perimeter level of "non-condensables, cooker smell and sulfides."
[3]) Odor detection as measured by the rendering facility as the "level" of total odor; i.e., treatment chemicals plus malodors.
[4]) Peroxyacetic control as per U.S. Pat. No. 6,015,536.
[5]) A 70/30 wt/wt ratio of α-pinene/benzaldehyde essential oil mixture.
[6]) A 70/30 wt/wt ratio of α-pinene/trans-cinnamaldehyde essential oil mixture

WORKING EXAMPLE #3

$H_2S$ Odor Reduction Through Addition of POAA and Activated Olefins (Dräger Gas Detector)

The level of hydrogen sulfide ($H_2S$) in the scrubber system in a rendering plant can be reduced by addition of a commercial peroxyacid (about 15% aqueous peracetic acid; Tsunami® 100—Ecolab Inc.) to the scrubber water. Further reduction of $H_2S$ can be achieved by combining the peroxy acid with an olefin compound (an essential oil is exemplified above). In this example, we investigate the effectiveness of other olefins used with a peracid. We found that additional reductions in the level of $H_2S$ occur with olefins present. The $H_2S$ reduction was especially marked with those olefins that are activated by substituent functionalities and/or pendant groups. These activator groups include: alkyl groups, aryl groups, alkylaryl groups, carbonyl groups (carboxylates, esters, amides, etc.), conjugated alkenyl or alkynyl groups, heteroatoms (especially N, S, P based), alkoxy groups, hydroxy groups, etc. For alkyl activators, at least three are useful. Beneficial olefins would include: unsaturated essential oils with multiple double bonds (e.g., pinenes, terpineols, terpinenes, carvones, cinnamaldehyde, citrals, ionenes, limonene, etc.), dipentene, maleic acid and esters, acrylate and methacrylate and itaconic acids and esters.

To simulate the circulation of water in a scrubber tower, we used a Glewwe spray unit (such a unit is shown and described in Steindorf, U.S. Pat. No. 5,447,648, which disclosure is specifically incorporated by reference herein for its discussion of the unit and its use in foaming tests). The Glewwe system can easily be used to test for $H_2S$ scrubbing performance. This system consists of a cylinder that is partially filled with water (4 liters of liquid in an 8 liter container), a spray head located above the level of the water in the cylinder, and a pump that circulates the water. To simulate the scrubber tower, a head that produces a cone-shaped spray of water was used. $H_2S$ gas was bubbled into the water in the bottom of the cylinder at a constant rate, and the level of $H_2S$ gas in the atmosphere within and at the top of the cylinder above the spray head was monitored with a commercially available sensor, a Dräger tube gas detector. After the level of $H_2S$ was allowed to equilibrate (at about 25 to 130 ppm), the additive being tested was added (via 2.8 ml dropping pipet) to the water in the cylinder and the water was stirred. The level of $H_2S$ gas was then monitored to record any decreases due to the addition of the additive, with a change of about 5% or greater being deemed as significant.

The results of the trials can be seen in Table 14. In the control experiments (1–2) using peracetic acid with no olefin, the addition of 2 pipets of an equilibrium 15% peracetic acid (POAA) resulted in a decrease of approximately 30% in the $H_2S$ level. Addition of certain non-activated (only containing 2 alkyl groups) olefins along with the POAA (experiments 3–7) did not increase the reduction in the $H_2S$ level, and in fact was found to reduce the odor reduction effectiveness of the POAA in most of the experiments (3–4, 6–7). The use of activated olefins such as maleic anhydride and pine oil in addition to the POAA did increase the reduction of the $H_2S$ gas level in excess of that measured when only POAA was used. The reduction found when maleic anhydride was added in addition to the POAA (experiment 9) was 61%, and that found when pine oil was added in addition to the POAA (experiment 8) was 50%.

TABLE 14

$H_2S$ Gas Reduction (Dräger Detector)

| Treatment Chemicals | Initial gaseous $H_2S$ Reading (ppm) | Post-Treatment gaseous $H_2S$ Reading (ppm) | % Reduction in initial $H_2S$ content |
|---|---|---|---|
| Control Experiments | | | |
| 1  2 pipets (5.6 ml) Tsunami 100 (15% peracetic acid) | 24 | 17 | 31 |
| 2  2 pipets (5.6 ml) Tsunami 100 | 75 | 53 | 30 |
| Non-Activated Olefins | | | |
| 3  2 pipets (5.6 ml) Tsunami 100[1] 0.1 pipet (0.28 ml) Exxon Dev. 110[2] | 24 | 24 | 0 |
| 4  2 pipets (5.6 ml) Tsunami 100 1 pipet (2.8 ml) Exxon Dev. Fl. 100 | 95 | 108 | −13 |
| 5  2 pipets (5.6 ml) Tsunami 100 0.1 pipet (0.28 ml) Soy Gold[3] | 48 | 34 | 28 |
| 6  2 pipets (5.6 ml) Tsunami 100 1 pipet (2.8 ml) Soy Gold | 125 | 105 | 16 |
| 7  2 pipets (5.6 ml) | 118 | 98 | 17 |

TABLE 14-continued

$H_2S$ Gas Reduction (Dräger Detector)

| Treatment Chemicals | Initial gaseous $H_2S$ Reading (ppm) | Post-Treatment gaseous $H_2S$ Reading (ppm) | % Reduction in initial $H_2S$ content |
|---|---|---|---|
| Tsunami 100 1 pipet (2.8 ml) Surfynol 82[4] | | | |
| Activated Olefins | | | |
| 8  2 pipets (5.6 ml) Tsunami 100 1 pipet (2.8 ml) Pine Oil | 105 | 53 | 50 |
| 9  2 pipets (5.6 ml) Tsunami 100 1.5 g Maleic Anhydride | 45 | 18 | 61 |

[1]From Ecolab Inc.
[2]From Exxon Chemical
[3]A methyl soyate (oleic acid 26%, linoleic acid 49%, linolenic acid 11%, saturated acids 14%. Free fatty acids are usually less than 1%, Phospholipids 1.5–4% - from AG Environmental Products L.L.C.
[4]An acetylenic diol surfactant from Air Products & Chemicals, Inc.

WORKING EXAMPLE #4

$H_2S$ Odor Reduction Through Addition of POAA and Activated Olefins (Quest Multilog 2000 Gas Sensor System)

The experiments in Example 5 were done with the same laboratory apparatus as the experiments in Example 4, except a Quest Multilog 2000 Gas Sensor System was used to monitor the $H_2S$ level instead of a Dräger tube gas detector.

The results of the trials can be seen in Table 15. In the control experiments (1–2), it was found that the addition of 2 pipets of Tsunami 100 (POAA) resulted in a decrease of 34% in the $H_2S$ level and 4 pipets of POAA resulted in a decrease of 50%. As in Example 4, the addition of non-activated olefins along with the POAA (experiments 3–8) generally did not increase the reduction in the $H_2S$ level, and in fact was found to reduce the odor reduction effectiveness of the POAA in most of the experiments (3–5,7). A slight increase of the reduction in the $H_2S$ levels was recorded for linoleic acid (experiment 6) and Surfynol 82 (experiment 8). As shown in earlier examples it found that the ratio of olefin to peracid is important and even some of the non-activated olefins might become useful if investigated further. An increase of the reduction in the $H_2S$ level was found when an activated olefin, itaconic acid, was added in addition to the POAA (experiment 9). The reduction recorded in this experiment was 50%.

TABLE 15

$H_2S$ Gas Reduction (Quest Detector)

| Treatment Chemicals | Initial $H_2S$ Reading (ppm) | Post-Treatment $H_2S$ Reading | % Reduction |
|---|---|---|---|
| Control Experiments | | | |
| 1  2 pipets (5.6 ml) Tsunami 100 | 275 | 182 | 34 |
| 2  4 pipets (11.2 ml) Tsunami 100 | 60 | 30 | 50 |
| Non-Activated Olefins | | | |
| 3  2 pipets (5.6 ml) Tsunami 100[1] 1 pipet (2.8 ml) Exxon Dev. Fl. 110 | 260 | 220 | 15 |
| 4  4 pipets Tsunami 100 1 pipet (2.8 ml) Exxon Dev. Fl. 110[2] | 665 | 512 | 23 |
| 5  2 pipets (5.6 ml) Tsunami 100 1 pipet (2.8 ml) Linoleic Acid | 195 | 170 | 13 |
| 6  4 pipets Tsunami 100 1 pipet (2.8 ml) Linoleic Acid | 63 | 25 | 60 |
| 7  2 pipets (5.6 ml) Tsunami 100 1 pipet (2.8 ml) Soy Gold[3] | 300 | 235 | 22 |
| 8  2 pipets (5.6 ml) Tsunami 100 1 pipet (2.8 ml) Surfynol 82[4] Activated Olefins | 245 | 155 | 37 |
| 9  2 pipets (5.6 ml) Tsunami 100 1.5 g. Itaconic Acid | 250 | 125 | 50 |

[1]From Ecolab Inc.
[2]Mixed mono-olefin from Exxon Chemical
[3]A methyl soyate (oleic acid 26%, linoleic acid 49%, linolenic acid 11%, saturated acids 14%. Free fatty acids are usually less than 1%, Phospholipids 1.5–4%) from AG Environmental Products L.L.C.
[4]Acetylenic diol surfactant from Air Products & Chemicals, Inc.

EXPERIMENTAL

COMPARISON EXAMPLE #1

As seen in FIG. 3, upon spiking an essential oil/olefin (pine oil) into a conventional treatment system such as chlorine or chlorine dioxide, the loss of oxidant is rapid; with essentially complete elimination within about five to ten minutes. This rapid oxidant loss would negate the simultaneous use of essential oil/olefins. In contrast, the peroxyacid rate of decay is much lower with a small residual remaining even after one hour. This improvement in the art is unexpected since the apparent ability of the peroxyacids to eliminate malodors should couple its ability to also oxidize the essential oil/olefins and thereby render both inactive. In other words, mutual destruction. This is the effect found in the other systems. The comparative data is also seen in Table 16 below:

TABLE 16

| Time (minutes) | POAA (Relative Rate) | Chlorine dioxide (Relative Rate) | Chlorine (Relative Rate) |
|---|---|---|---|
| 0 | 90 | 130 | 150 |
| 0.5 | 77 | 90 | 110 |
| 1 | 73 | 30 | 70 |
| 2 | 70 | 5 | 30 |
| 5 | 68 | 0 | 5 |
| 10 | 63 | 0 | 0 |
| 20 | 55 | 0 | 0 |

TABLE 16-continued

| Time (minutes) | POAA (Relative Rate) | Chlorine dioxide (Relative Rate) | Chlorine (Relative Rate) |
|---|---|---|---|
| 45 | 38 | 0 | 0 |
| 60 | 8 | 0 | 0 |

The data set forth in the examples and tables above show that combining a peroxy compound and an olefin can produce a treating stream that is surprisingly effective in reducing odor using $H_2S$ as a model odor compound. Our experience in using these systems indicates that $H_2S$ is a good model for odor systems and is useful to model complex odors. A broad array of olefin compounds including relatively simple olefin oligomers and complex di-, tri-, etc. pinene compounds are all effective in odor reduction. We have shown that this odor reduction is not a simple masking, but comprises a chemical reaction between the odor components, the peracid and the olefin material to reduce odor by absorbing the odor compounds and to an aqueous solution that removes the odor from the atmosphere.

The above specification, example and data provide a clear basis for understanding the operation of the compositions and methods of the invention. While the invention can be embodied in a variety of specific examples and processes, the invention resides in the claims hereinafter appended.

We claim:

1. A process for removing an odor component from an atmospheric effluent, the process comprising:
    (a) contacting an atmospheric effluent comprising an odor component with an aqueous peroxygen treatment composition and an olefin compound, forming an oxidized odor component and dissolving the oxidized odor component or an odor component in the aqueous treatment composition to form a treated effluent and a used aqueous treatment containing the odor component or oxidized odor component;
    (b) removing at least a portion of the used treatment; and
    (c) returning the treated effluent to the atmosphere.

2. The process of claim 1 wherein the atmospheric effluent originates from a plant treating organic material, the odor selected from the group consisting of an organic sulfur compound, an oxo-hydrocarbon, an organic nitrogen and mixtures thereof.

3. The process of claim 1 wherein the odor is removed as measured by an odor threshold score which is reduced by 20% or more.

4. The process of claim 1 wherein a wet scrubber tower is used to contact the effluent with the treatment composition.

5. The process of claim 1 wherein a venturi contactor is used to contact the effluent with the treatment composition.

6. The process of claim 4 wherein in the wet scrubber tower, the atmospheric effluent is a gaseous stream passing vertically against a countercurrent flow of finely divided particulates or thin streams of the aqueous peroxygen treatment composition.

7. The process of claim 1 wherein the aqueous peroxygen treatment composition comprises a peroxyacetic acid composition.

8. The process of claim 7 wherein the aqueous treatment composition comprises less than 4 parts by weight of acetic acid per each part of peroxyacetic acid and a sequestrant.

9. The process of claim 7 wherein the aqueous treatment composition comprises less than 2.5 parts by weight of acetic acid per each part of peroxyacetic acid.

10. The process of claim 7 wherein the aqueous treatment composition comprises less than 5 parts by weight of hydrogen peroxide per each part of peroxyacetic acid.

11. The process of claim 7 wherein the aqueous treatment composition comprises less than 2 parts by weight of hydrogen peroxide per each part of peroxyacetic acid.

12. The process of claim 1 wherein the aqueous peroxygen treatment composition comprises a residual acetic acid concentration of less than about 600 parts by weight per one million parts of the treatment composition.

13. The process of claim 1 wherein the aqueous peroxygen treatment composition comprises a residual acetic acid concentration of less than about 400 parts by weight per one million parts of the treatment composition.

14. The process of claim 1 wherein the aqueous peroxygen treatment composition comprises a residual acetic acid concentration of less than about 300 parts by weight per one million parts of the treatment composition.

15. The process of claim 1 wherein the aqueous peroxygen treatment composition comprises a residual peroxyacid and hydrogen peroxide concentration resulting in an active oxygen concentration of less than about 400 parts by weight of active oxygen per one million parts of the treatment composition.

16. The process of claim 1 wherein the aqueous peroxygen treatment composition comprises a residual peroxyacid and hydrogen peroxide concentration resulting in an active oxygen concentration of less than about 270 parts by weight of active oxygen per one million parts of the treatment composition.

17. The process of claim 1 wherein the aqueous peroxygen treatment composition comprises a residual peroxyacid and hydrogen peroxide concentration resulting in an active oxygen concentration of less than about 150 parts by weight of active oxygen per one million parts of the treatment composition.

18. The process of claim 7 wherein the aqueous treatment composition comprises a concentrate that comprises 1 to 90 weight percent (wt %) of acetic acid, 1 to 50 wt % of hydrogen peroxide, a sequestrant, and 1 to 40 wt % of peroxyacetic acid.

19. The process of claim 8 wherein the sequestrant comprises 1-hydroxyethylidene-1,1-diphosphonic acid.

20. The process of claim 6 wherein one cubic foot of atmospheric effluent is contacted with about 0.01 to 10 liters of aqueous treatment composition.

21. The process of claim 1 wherein at least about 20% of an odor forming compound selected from the group consisting of an oxo-hydrocarbon, organomercaptan, an amine, ammonia, hydrogen sulfide and mixtures thereof, is absorbed and removed in the process from the atmospheric effluent and wherein the odor threshold is reduced by at least 20%.

22. The process of claim 6 wherein the scrubber comprises a packed column.

23. The process of claim 6 wherein, in the wet scrubber tower, the atmospheric effluent is a gaseous stream passing vertically with a concurrent flow of finely divided particulates or thin streams of the aqueous peroxygen treatment composition.

24. The process of claim 1 wherein the olefin compound comprises an unsaturated carboxylic acid.

25. The process of claim 24 wherein the unsaturated carboxylic acid comprises an unsaturated dicarboxylic acid.

26. The method of claim 24 wherein the unsaturated carboxylic acid comprises acrylic acid, methacrylic acid, glutaconic acid, methacrylate or mixtures thereof.

27. The method of claim 1 wherein the olefin comprises an unsaturated carboxyl ester.

28. The method of claim 27 wherein the unsaturated carboxyl ester comprises vinyl acetate.

29. The method of claim 24 wherein the unsaturated carboxylic acid comprises undecylenic acid, tall oil, fatty acid, ricinoleic acid, oleic acid, linoleic acid or mixtures thereof.

30. The method of claim 24 wherein the unsaturated carboxylic acid comprises a carboxylic acid ester, sulfonate, sulfate or alkoxylate thereof.

31. The method of claim 24 wherein the unsaturated carboxylic acid comprises an unsaturated carboxylic triglyceride.

32. The method of claim 1 wherein the olefin compound comprises a polyolefin.

33. The process of claim 1 wherein the olefin compound comprises an essential oil.

34. The process of claim 33 wherein the essential oil is a terpene.

35. The process of claim 34 wherein the terpene is selected from the group consisting of citral, camphor, α and β-pinene, terpineol, limonene, α and β-terpinene, α and β-phellandrene, cedrene, geraniol, linalool, neral and abietic acid.

36. The process of claim 34 wherein the terpene is selected from the group consisting of mono-, di-, tri- and tetra unsaturated olefin terpenes.

37. The process of claim 34 wherein the terpene is selected from the group consisting of citral, camphor, α and β-purene, terpineol and limonene.

38. The process of claim 33 wherein the essential oil is an aldehyde.

39. The process of claim 38 wherein the aldehyde is selected from the group consisting of benzaldehyde and cinnamaldehyde.

* * * * *